United States Patent [19]

Holland

[11] Patent Number: 5,084,140
[45] Date of Patent: Jan. 28, 1992

[54] DESTRUCTION OF MACROMOLECULAR WASTE

[76] Inventor: Kenneth M. Holland, Ashwood, Wynwoods, Campbell Close, Romford, United Kingdom

[21] Appl. No.: 558,706

[22] Filed: Jul. 27, 1990

Related U.S. Application Data

[63] Continuation-in-part of Ser. No. 335,210, filed as PCT/GB88/00378, May 13, 1988, abandoned.

[30] Foreign Application Priority Data

Nov. 11, 1986 [GB] United Kingdom ............... 8726396
May 13, 1987 [GB] United Kingdom ............... 8711257

[51] Int. Cl.⁵ .............................................. C10B 53/00
[52] U.S. Cl. .......................................... 201/19; 201/21; 201/25; 201/31; 201/40; 204/158.21; 423/DIG. 20
[58] Field of Search ................ 201/2.5, 12, 18, 19, 201/21, 25, 28, 31, 40; 585/241, 240; 423/DIG. 20, 481; 204/158.2, 158.21, 157.43

[56] References Cited

U.S. PATENT DOCUMENTS

| | | | |
|---|---|---|---|
| 3,449,213 | 6/1969 | Knapp et al. | 201/19 |
| 3,843,457 | 10/1974 | Grannen et al. | 201/19 |
| 4,118,282 | 10/1978 | Wallace | 201/2.5 |
| 4,171,345 | 10/1979 | Toshev et al. | 585/241 |
| 4,203,804 | 5/1980 | Janning et al. | 201/25 |
| 4,345,983 | 8/1982 | Wan | 204/158.21 |
| 4,402,791 | 9/1983 | Brewer | 201/25 |
| 4,436,588 | 3/1984 | Rammler et al. | 201/28 |
| 4,935,114 | 6/1990 | Varma | 204/158.21 |

Primary Examiner—Joye L. Woodard
Attorney, Agent, or Firm—Rodman & Rodman

[57] ABSTRACT

The macromolecular waste (which is not itself susceptible to microwave heating and may be, for example, plastics or polychlorinated biphenyl) is mixed (B) with pulverulent carbonaceous material, which comprises elemental carbon or is degradable by microwave irradiation to elemental carbon (such as waste tire material). The mix is subjected to microwave irradiation (C) in an inert atmosphere to cause pyrolysis of the plastics. Preferably part of the resulting solids is recycled to the microwave zone (C).

27 Claims, 3 Drawing Sheets

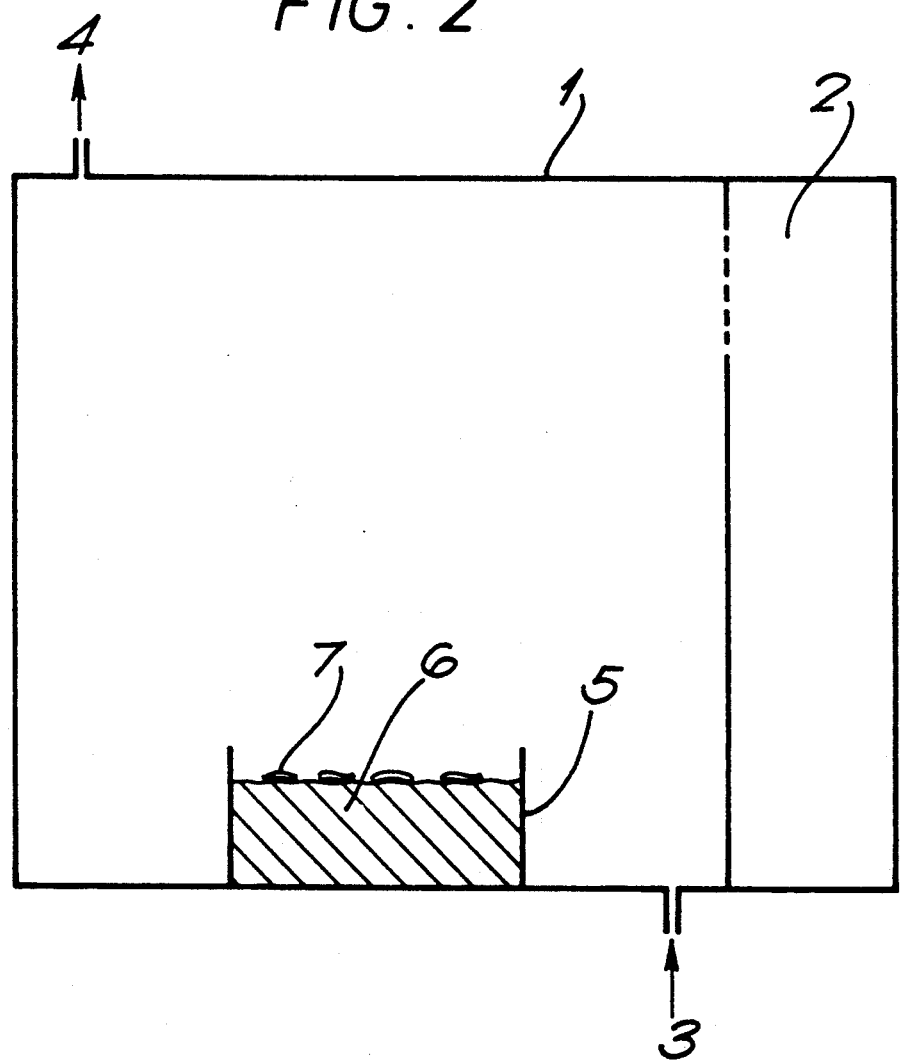

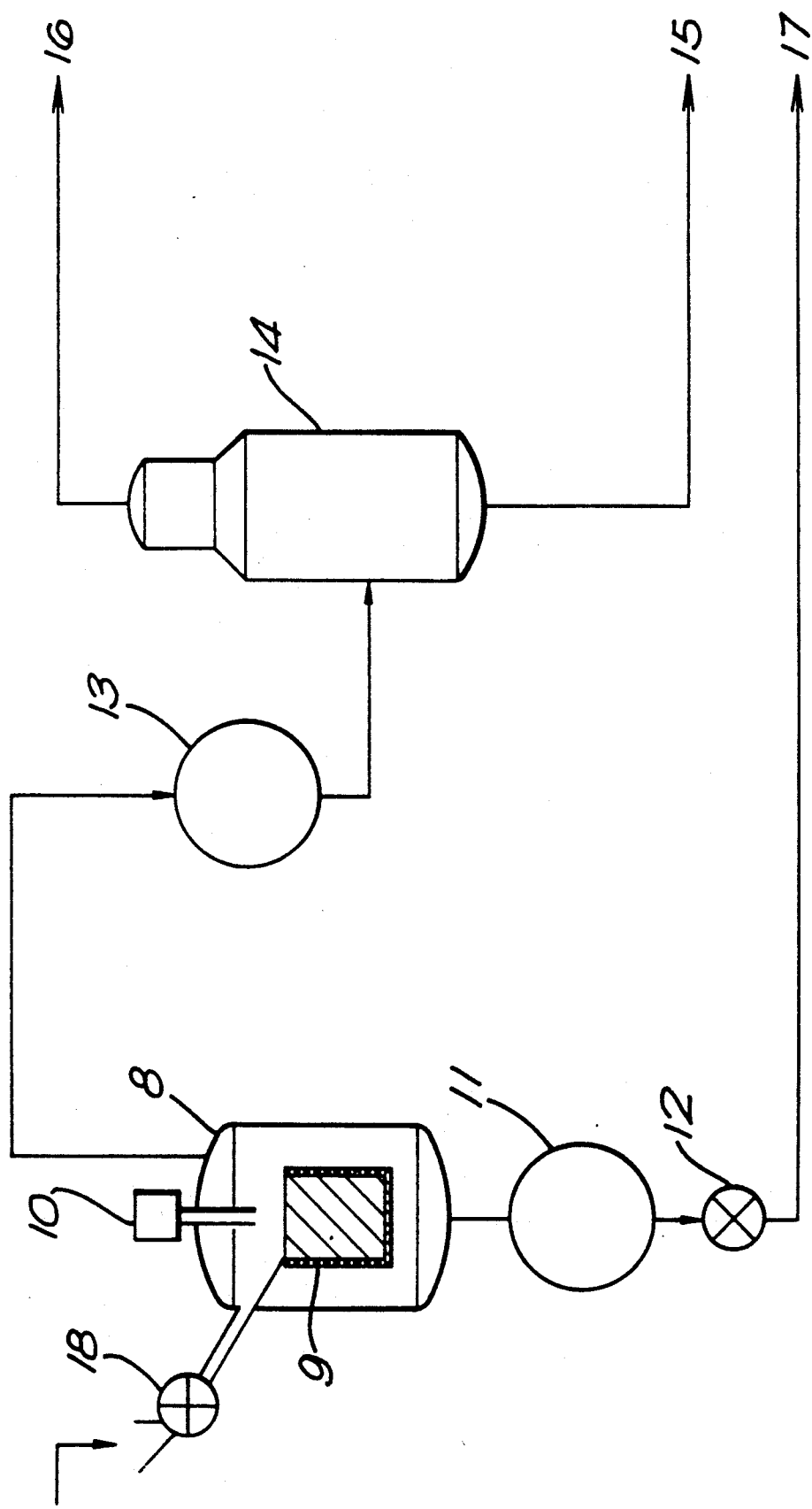

DESTRUCTION OF MACROMOLECULAR WASTE

This is a continuation-in-part of application Ser. No. 335,210 filed as PCT/GB88/00378, May 13, 1988, and now abandoned.

BACKGROUND OF THE INVENTION

The present invention is concerned with the destruction of macromolecular waste.

DESCRIPTION OF THE PRIOR ART

The destruction of plastics waste is a substantial problem, because of the increasing amount of plastics materials being used in, for example, automobile bodies and packaging. Such plastics waste is generally disposed of either by incineration or by use as landfill; the former method is objectionable on environmental grounds because of the nature of some of the combustion gases produced, while the latter method is inefficient because of the large bulk of plastics material. Similarly, the destruction of materials such as polychlorinated biphenyls (PCB's) and non-biodegradable matter screened from sewage is also a substantial problem.

SUMMARY OF THE INVENTION

According to the present invention, there is provided a method for the destruction of macromolecular waste material which is not itself susceptible to heating by microwave radiation. The method comprises contacting the waste material with a pulverulent material, which consists of or contains carbon in elemental form and is susceptible to heating by microwave irradiation, the pulverulent material being retained in an atmosphere which is such that flame generation is substantially prevented in retaining means which is inert to microwave radiation. The material present in the retaining means is subjected to microwave irradiation, such that the pulverulent material is heated and thermal energy is transferred to the waste material so as to cause substantial thermal degradation (pyrolysis) of the plastics waste.

BRIEF DESCRIPTION OF THE DRAWINGS

In the accompanying drawings.

FIG. 2 is a schematic illustration of the operation of an exemplary embodiment of a method according to the invention; and FIG. 3 is a schematic illustration of an exemplary process plant for use in the method according to the invention.

DESCRIPTION OF THE PREFERRED EMBODIMENTS

Figure 1:
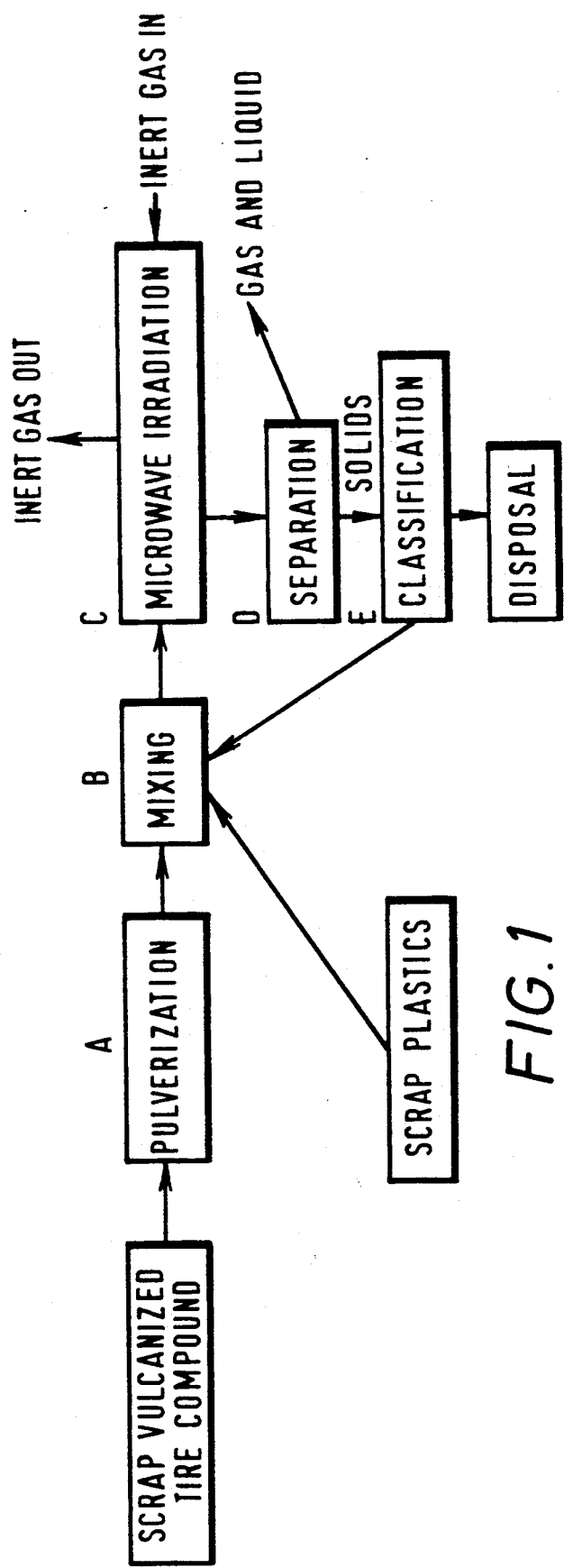
FIG. 1 is a block diagram illustrating a typical sequence of operations in an exemplary embodiment of a method according to the invention.

The pulverulent material employed in the method according to the invention is a carbonaceous material consisting of or containing elemental carbon, or capable of being degraded or pyrolyzed by microwave irradiation to elemental carbon. A particularly preferred material which can be degraded by microwave irradiation is carbon-filled vulcanized rubber, such as a waste tire compound in chopped or finely divided form. Waste tire compounds generally contain rubber, carbon filler and reinforcement of organic textile and/or metal wire. When an organic textile reinforcement is employed, the latter is generally substantially carbonized by microwave irradiation; when metal wire reinforcement is employed, the latter would be substantially unaffected by the microwave discharge and can therefore be collected together with solid pyrolysis products.

The microwave radiation is preferably employed at such a power and for sufficient time that the pulverulent material is heated to at least 400° C. When the method according to the invention is carried out in a substantially oxygen-free atmosphere, there would in general only be a danger of production of dioxin or other noxious products with certain feedstocks. In such cases, and also in cases where a small amount of oxygen is present but without sufficient thereof to cause flame generation, it is preferred to ensure that the carbonaceous material (and therefore the plastics or other waste) attains a temperature of at least 800° C., which is sufficiently high that the risk of evolution of dioxins or similar noxious products by the pyrolyzed material is minimized or eliminated.

If the macromolecular waste material being destroyed (pyrolyzed) in the method according to the invention is relatively easily degraded (e.g. polyethylene or nylon), then temperatures from 400° to 800° C. may be satisfactorily employed. When more thermally resistant plastics and halogenated plastics (such as PTFE or PVC) are employed, the temperature of the cabonaceous material may be at least 800° C.

The retaining means employed in the method according to the invention may be, for example, a fluidized bed or a thermally resistant receptacle. Such a receptacle may be of a material such as stainless steel or a ceramic material which is preferably resistant to temperatures of at least about 800° C., typically or the order of 1000° C.

Especially when the pulverulent material is employed in the form of a fluidized bed, the method according to the present invention can be operated as a continuous process. It is preferred that the pulverulent material should be fluidized at least partially by means of hot recycled gaseous by-products (such as hydrogen and/or methane) from the microwave irradiation zone. The pulverulent material is preferably supplied continuously and allowed to overflow from the fluidized bed.

In the case where a static receptacle for retaining the pulverulent material is employed, it is preferred that the latter should be open-topped and of a material which is reflective to microwaves (such as stainless steel). The receptacle may be refractory-lined if higher temperature operation (that is, above about 600° C.) is envisaged. When such a static receptacle is employed, solid products resulting from the microwave irradiation step may be removed mechanically.

The macromolecular waste material may be supplied either continuously, semi-continuously or intermittently (in a batch process, for example). It is preferred to supply the macromolecular waste material in such a manner that the pulverulent material is allowed to overflow from the receptacle as denser macromolecular waste material sinks towards the bottom of the receptacle displacing the less dense carbonaceous material upwards as it does so. (The bulk specific gravity of finely divided elemental carbon is for example about 0.5 whereas waste material such as plastics normally has a bulk specific gravity of about 0.8 to 1.0.) The macromolecular waste material is pyrolyzed as it sinks, whilst the pulverulent carbonaceous material overflowing from the static bed is at least partly recycled thereto. The rate of feed depends largely on the power of the microwave discharge used during pyrolysis.

The macromolecular waste material to be pyrolyzed in the method according to the invention may be any of the conventional plastics materials, which may be thermoplastic or thermoset. Typically, such materials include polyolefins (e.g. polyethylene, polypropylene or the like), polyamides, polyesters (for example, polyethylene terephthalate), polyurethanes and halogenated polymers (for example, PVC).

Referring to FIG. 1, scrap vulcanised tire compound is passed to pulverization zone A where it is reduced to suitably sized particles. The resulting pulverulent material is then passed to mixing zone B, where it is mixed with scrap plastics (such that it is at least partially submerged in the carbonaceous material).

The mixed pulverulent material and plastics are then passed to microwave irradiation zone C, which is continuously flushed with an inert gas (such as nitrogen or inert by-product gas from the microwave irradiation zone) via purged sequenced air-locks (not shown). In the microwave irradiation zone C, chopped or finely divided scrap tire material is rapidly raised to red heat, which heat is transferred to the plastics to cause pyrolysis of the latter.

In some embodiments, it is preferred that the plastics should be substantially free of halogen and nitrogen, in order to avoid production of noxious gases. It is particularly preferred that the plastics consist substantially wholly of carbon and hydrogen and, optionally, oxygen.

The macromolecular waste material may be in finely divided form, or bulk form, provided it can be contacted with the carbonaceous material by, for example, partial immersion or, in some embodiments, total immersion.

It is preferred that the volumetric ratio of the macromolecular waste material to the pulverulent material should be about 1:4 to 6, such as substantially about 1:5. This is to ensure that the macromolecular material is surrounded by a medium of carbonaceous material during the pyrolysis process.

The wavelength of the microwave radiation employed depends on the particular carbonaceous material used; the wavelength is such that it causes substantial heating of the pulverulent material. It is typically in the low gigahertz frequency range (e.g. about 2.4 gigahertz), although higher wavelengths can be employed if wished.

It is particularly preferred to ensure that the by-product gases from the microwave irradiation zone are rendered non-pollutant before being vented to the atmosphere; this can be achieved by scrubbers or similar means. The by-product gases are typically recovered for use as preheating medium, fuel or the like. The nature of such gases depends on the chemical nature of the feedstock, as well as the temperature achieved in the microwave irradiation process. The solids resulting from the microwave irradiation step may be recycled for use as the carbonaceous material in a further microwave irradiation step; alternatively, they may be used as a fuel.

Gases and liquids produced are then separated in zone D; the solids are then passed to a classification zone E, from which suitably sized solids are recycled to mixing zone B (or alternatively direct to irradiation zone C), while still hot, so as to preheat the plastics waste.

The process as described with reference to FIG. 1 is particularly suitable for operation in a continuous manner. Pulverulent carbonaceous material and/or plastics or other macromolecular waste is supplied continuously to the fluidized bed, and the carbonaceous material is allowed to overflow therefrom. The recycling of at least part of the carbonaceous material to the microwave irradiation zone is particularly preferred because of the economy of energy input which can be achieved, because the plastics or other waste is partly heated to pyrolysis temperature by the recycled material.

Referring to FIG. 2, there is shown a microwave oven 1 incorporating a microwave generator 2, an inlet 3 for inert gas (such as nitrogen) and an outlet 4 for the inert gas and evolved gases.

Disposed within the oven is a bowl or other suitable receptacle 5 (of stainless steel, ceramic or the like) partially filled with pulverulent carbonaceous medium 6; plastics waste 7 is partially immersed in the latter.

In an example, a one kilowatt industrial microwave oven was employed, and the bowl disposed in the oven charged with approximately one kilogram of pulverulent carbonaceous medium and a similar quantity of plastics or other macromolecular waste. The oven was then supplied with an oxygen-free atmosphere and then actuated for irradiation for a period of three minutes, during which period, the carbonaceous material became red hot (about 800° C.).

Gases evolved were removed by an extractor fan and passed to a cleaning/scrubbing apparatus (not shown); the powder remaining in the bowl was then ready for charging with fresh quantities of plastics waste.

Referring now to the process plant illustrated in FIG. 3, the plastics or other macromolecular waste material, and the pulverulent carbonaceous material are supplied together to a refractory lined stainless steel pyrolysis chamber 9, in a reactor 8, via an air lock 18. The mix in the chamber is then exposed to microwave irradiation from a microwave generator 10.

The pulverulent material (including waste material which has been pyrolysed to elemental carbon) overflows from the pyrolysis chamber 9 and passes through a carbon cooler 11 and air lock 12 before being recovered from the process as a solid carbon product 17. Hydrocarbon gases evloved during the pyrolysis process are passed out of the reactor 8, and through a hydrocarbon cooler 13 before entering a liquid gas separator 14 which separates the waste gas into oil products 15 and (acidic) waste gases 16. The waste gases may then be "scrubbed" before being released to the atmosphere.

I claim:

1. A method for the pyrolysis of macromolecular waste material which is not itself susceptible to heating by microwave radiation, which comprises the steps of:
   (a) retaining, in retaining means which is inert to microwave radiation, a bed of pulverulent material which consists of or contains carbon in elemental form, or a material which is capable of being pyrolyzed to elemental carbon by microwave irradiation, and wherein said pulverulent material is susceptible to heating by microwave irradiation, under an atmosphere wherein flame generation is substantially prevented;
   (b) feeding said waste material to an upper part of the bed of pulverulent material retained in said retaining means such that said macromolecular waste material sinks through said bed; and
   (c) subjecting said pulverulent material to microwave irradiation such that said bed of pulverulent material is heated and thermal energy is transferred from said pulverulent material to said waste material, the dose and intensity of said radiation being controlled so as to cause substantial pyrolysis of said waste material as said waste material sinks through said bed.

2. A method according to claim 1, wherein said waste material comprises plastic material.

3. A method according to claim 1, wherein the microwave radiation heats the pulverulent material to a temperature of at least 400° C.

4. A method according to claim 1 where said pulverulent material comprises scrap carbon-filled vulcanized rubber.

5. A method according to claim 1, wherein at least part of said pulverulent material is allowed to pass out of said retaining means and is subsequently recycled thereto.

6. A method according to claim 1, wherein a fluidized bed of said pulverulent material is produced in said retaining means by passing a gaseous medium therethrough during the step of subjecting said pulverulent material to microwave irradiation.

7. A method according to claim 6, wherein said pulverulent material is fluidized by means of a gaseous medium comprising hot gaseous by-products produced by thermal degradation of said waste material.

8. A method according to claim 6, wherein said pulverulent material is supplied continuously to said fluidized bed and continuously allowed to overflow therefrom.

9. A method according to claim 1, wherein said retaining means comprises an open-topped receptacle.

10. A method according to claim 9, wherein said receptacle comprises stainless steel.

11. A method according to claim 9, wherein said waste material is supplied to said receptacle in such a manner that said pulverulent material is allowed to overflow from said receptacle and is then recycled thereto.

12. A method according to claim 1, wherein said waste material is substantially free of halogen-containing and/or nitrogen-containing plastics material.

13. A method according to claim 1, wherein said waste material comprises polychlorinated biphenyls.

14. A method according to claim 1, wherein said plastics material is contacted with said pulverulent material in a ratio, by volume, of 1 part plastics material: 4 to 6 parts of pulverulent material.

15. A method according to claim 1, wherein said atmosphere is substantially oxygen-free.

16. A method for the pyrolysis of macromolecular waste material which is not itself susceptible to heating by microwave radiation, which comprises the steps of:

(a) retaining, in retaining means which is inert to microwave radiation, a bed of pulverulent material which comprises scrap carbon-filled vulcanized rubber, under an atmosphere wherein flame generation is substantially prevented;

(b) contacting said waste material with the bed of said pulverulent material by feeding said waste material to an upper part of said bed while the pulverulent material is present in said retaining means; and (c) subjecting said pulverulent material to microwave irradiation such that said pulverulent material is heated and thermal energy is transferred from said pulverulent material to said waste material, the dose and intensity of said radiation being controlled so as to cause substantial pyrolysis both of said waste material and of said pulverulent material.

17. A method according to claim 16, wherein at least part of said pulverulent material is allowed to pass out of said retaining means and is subsequently recycled thereto.

18. A method according to claim 16, wherein a fluidized bed of said pulverulent material is produced in said retaining means by passing a gaseous medium therethrough during the step of subjecting said pulverulent material to microwave irradiation.

19. A method according to claim 18, wherein said pulverulent material is fluidized by means of a gaseous medium comprising hot gaseous by-products produced by pyrolysis of said waste material.

20. A method according to claim 18, wherein said pulverulent material is supplied continuously to said fluidized bed and continuously allowed to overflow therefrom.

21. A method according to claim 16, wherein said retaining means comprises an open-topped receptacle.

22. A method according to claim 21, wherein said receptacle comprises stainless steel.

23. A method according to claim 21, wherein said waste material is supplied to said receptacle in such a manner that said pulverulent material is allowed to overflow from said receptacle and is then recycled thereto.

24. A method according to claim 16, wherein said waste material comprises polychlorinated biphenyls.

25. A method according to claim 16, wherein said waste material comprises plastic material.

26. A method according to claim 25, wherein said plastic material is contacted with said pulverulent material in a ratio, by volume, of 1 part plastic material: 4 to 6 parts of pulverulent material.

27. A method according to claim 16, wherein said atmosphere is substantially oxygen-free.

* * * * *